United States Patent
Park et al.

(10) Patent No.: US 8,284,346 B2
(45) Date of Patent: Oct. 9, 2012

(54) BACKLIGHT UNIT AND LIQUID CRYSTAL DISPLAY DEVICE INCLUDING THE SAME

(75) Inventors: Jae-Hyun Park, Busan (KR); Sung-Hun Kim, Gyeongsangbuk-do (KR); Jong-Keun Shin, Gyeongsangbuk-do (KR); Jin-Hyuk Kwon, Gyeongsangbuk-do (KR); Byoung-Ku Kim, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 322 days.

(21) Appl. No.: 12/318,290

(22) Filed: Dec. 24, 2008

(65) Prior Publication Data
US 2010/0060817 A1    Mar. 11, 2010

(30) Foreign Application Priority Data
Sep. 11, 2008   (KR) ................. 10-2008-0089876

(51) Int. Cl.
G02F 1/1335  (2006.01)
G09F 13/08   (2006.01)
F21V 5/00    (2006.01)
F21V 7/04    (2006.01)

(52) U.S. Cl. .......... 349/62; 349/64; 362/97.2; 362/327; 362/606; 362/607

(58) Field of Classification Search .................. 362/327, 362/606, 607; 349/62
See application file for complete search history.

(56) References Cited

U.S. PATENT DOCUMENTS
2003/0020399 A1 * 1/2003 Moller et al. ............... 313/504
2008/0192484 A1 * 8/2008 Lee et al. .................... 362/327

FOREIGN PATENT DOCUMENTS
JP   2000284268 A * 10/2000
JP   2007256575 A * 10/2007
JP   2008145549 A *  6/2008

* cited by examiner

Primary Examiner — Michelle R Connelly
(74) Attorney, Agent, or Firm — Morgan, Lewis & Bockius LLP

(57) ABSTRACT

A backlight unit for a liquid crystal display panel includes a diffusor that diffuses light emitted from a front surface thereof, a reflective plate that reflects light toward a rear surface of the diffusor; and a collimator that collimates the light emitted from the front surface of the diffusor toward the liquid crystal display panel. The collimator includes a base layer that refracts the diffused light from the diffusor toward the liquid crystal panel, a collimating layer of lenses disposed along two perpendicular directions on a front surface of the base layer, and a reflective pattern on a rear surface of the base layer along a boundary of each of the lenses, the reflective pattern exposing an aperture portion of the base layer facing each of the lenses.

20 Claims, 9 Drawing Sheets

BACKLIGHT UNIT AND LIQUID CRYSTAL DISPLAY DEVICE INCLUDING THE SAME

This application claims the benefit of Korean Patent Application No. 10-2008-0089876 filed on Sep. 11, 2008, which is hereby incorporated by reference in its entirety.

FIELD OF THE INVENTION

The present application relates to a liquid crystal display device, and more particularly, to a backlight unit for a liquid crystal display device.

BACKGROUND

As information age progresses, flat panel display (FPD) devices having light weight, thin profile, and low power consumption have been substituted for cathode ray tube (CRT) devices. Liquid crystal display (LCD) devices, plasma display panel (PDP) devices, field emission display (FED) devices, and electroluminescent display (ELD) devices are examples of the FPD devices. LCD devices have been widely used for a notebook computer, a monitor and a television because of their superiority in displaying moving images and high contrast ratio. Since the LCD device is a non-emissive type, an additional light source is required for the LCD device. For example, a backlight unit is disposed under a liquid crystal panel to supply light.

The backlight unit may be classified into a side light type and an edge light type according to a position of the light source. In the side light type backlight unit, light from the light source is refracted in a light guide plate and emitted to the liquid crystal panel. In the direct type backlight unit, a plurality of light sources are disposed directly under the liquid crystal panel and light from the plurality of light sources is emitted to the liquid crystal panel.

FIG. 1 is a cross-sectional view of a liquid crystal display device including a side light type backlight unit according to the related art. Referring to FIG. 1, a liquid crystal display (LCD) device includes a liquid crystal panel 10, a backlight unit 20, a top frame 40, a main frame 30 and a bottom frame 50. The liquid crystal panel 10 includes first and second substrates 12 and 14 facing and spaced apart from each other and a liquid crystal layer (not shown) between the first and second substrates 12 and 14. A printed circuit board (PCB) (not shown) may be connected to at least one side of the liquid crystal panel through a connection means, such as a flexible printed circuit (FPC).

The backlight unit 20 is disposed under the liquid crystal panel 10. The backlight unit 20 includes a lamp 24, a lamp guide 28, a reflective plate 22, a light guide plate 26 and a plurality of optical sheets 60. The lamp 24 is disposed along at least one side of the main frame 30, and the lamp guide 28 wraps the lamp 24 for reflection and protection. The reflective plate 22, the light guide plate 26 and the plurality of optical sheets 60 are sequentially disposed over the bottom frame 50.

FIG. 2 is a perspective view of a plurality of optical sheets of a backlight unit for a liquid crystal display device according to the related art. Referring to FIG. 2, a plurality of optical sheets 60 includes a diffusing sheet 61, a first prism sheet 63, a second prism sheet 65 and a protecting sheet 67. The first and second prism sheets 63 and 65 collimate light for improving brightness, and the protecting sheet 67 protects the second prism sheet 65. The first and second prism sheets 63 and 65 include first and second prism patterns 63a and 65a, respectively. The first prism pattern 63a is disposed perpendicular to the second prism pattern 65a. Accordingly, the first and second prism sheets 63 and 65 collimate light toward the liquid crystal panel 10 (of FIG. 1) to improve light efficiency and viewing angle.

FIG. 3 is a cross-sectional view of a prism sheet of a backlight unit for a liquid crystal display device according to the related art. Referring to FIG. 3, a prism sheet 63 having a rear surface and a front surface includes a prism pattern 63a corresponding to the front surface. Light from the backlight unit 20 enters the rear surface of the prism sheet 63 at first, second and third regions A, B and C of the rear surface of the prism sheet 63. Light entering the prism sheet 63 may have an incident angle of about 5°. The light entering the prism sheet 63 is refracted at the rear surface.

The light entering the first region A is refracted at the front surface of the prism pattern 63a and is emitted toward the liquid crystal panel 10 (shown in FIG. 1) to increase brightness. The light entering the second region B is totally reflected at the front surface of the prism pattern 63a and is emitted from the rear surface of the prism sheet 63 toward the rear of the backlight 20. The light emitted from the rear surface of the prism sheet 63 may be reflected at the reflective plate 22 (shown in FIG. 1) back to the prism sheet 63.

Thus, light loss through the second region B is minimized by recycling the light reflected back toward the rear of the backlight unit 20. However, loss of light through a side lobe of the prism sheet 63 causes deterioration of light efficiency and reduction of viewing angle. For example, the light entering the third region C is reflected and refracted at the front surface of the prism pattern 63a, but is not incident on the liquid crystal panel 10. As a result, the light entering the third region C may be scattered away from the liquid crystal panel 10 and be lost.

FIG. 4 is a graphical simulation of luminance of light passing through a prism sheet of a backlight unit of a liquid crystal display device according to the related art. Referring to FIG. 4, the light entering the first region A (shown in FIG. 3) is emitted along a front direction toward the liquid crystal panel 10 (shown in FIG. 1), while the light entering the third region C (shown in FIG. 3) is emitted along two opposite side directions (side lobe) and is not incident on the liquid crystal panel 10. As a result, the light entering the third region C is refracted away from the liquid crystal panel 10 and is lost as a light leakage toward an undesired direction at the front surface of the prism pattern 63a (shown in FIG. 3).

Since the plurality of optical sheets 60 (shown in FIG. 2) include the first and second prism sheets 63 and 65 (shown in FIG. 2) that have the first and second prism patterns 63a and 65a disposed perpendicular to each other, the light loss may be reduced so that light efficiency and viewing angle property can be improved. However, since the first and second prism sheets 63 and 65 are used for the plurality of optical sheets 60, process time increases and process efficiency decreases. Moreover, production cost increases. Furthermore, the thickness and the weight of the related art backlight unit 20 also increase.

SUMMARY OF THE INVENTION

Accordingly, embodiments of the invention are directed to a backlight unit and a liquid crystal display device including the same that substantially obviate one or more problems due to limitations and disadvantages of the related art.

An object of the invention is to increase the brightness of a backlight unit for a liquid crystal device.

Another object of the invention is to improve the light efficiency of a backlight unit for a liquid crystal device.

Another object of the invention is to reduce the thickness of a backlight unit for a liquid crystal device.

Another object of the invention is to reduce the weight of a backlight unit for a liquid crystal display device.

Additional features and advantages of the invention will be set forth in the description of exemplary embodiments which follows, and in part will be apparent from the description of the exemplary embodiments, or may be learned by practice of the exemplary embodiments of the invention. These and other advantages of the invention will be realized and attained by the structure particularly pointed out in the written description of the exemplary embodiments and claims hereof as well as the appended drawings.

To achieve these and other advantages and in accordance with the purpose of the invention, as embodied and broadly described, a backlight unit for a liquid crystal display panel includes a diffusor that diffuses light emitted from a front surface thereof, a reflective plate that reflects light toward a rear surface of the diffusor, and a collimator that collimates the light emitted from the front surface of the diffusor toward the liquid crystal display panel. The collimator includes a base layer that refracts the diffused light from the diffusor toward the liquid crystal panel, a collimating layer of lenses disposed along two perpendicular directions on a front surface of the base layer, and a reflective pattern on a rear surface of the base layer along a boundary of each of the lenses, the reflective pattern exposing an aperture portion of the base layer facing each of the lenses.

In another aspect, a backlight unit for a liquid crystal display panel includes a diffusor that diffuses light emitted from a front surface thereof, and a collimator that collimates the light emitted from the front surface of the diffusor toward the liquid crystal display panel. The collimator includes a base layer that refracts the diffused light from the diffusor toward the liquid crystal panel, a collimating layer of lenses on a front surface of the base layer, each of the lenses refracts the light refracted from a first region of the base layer toward the liquid crystal panel and reflects the light refracted from a second region of the base layer to a rear surface of the base layer, and a reflective pattern on the rear surface of the base layer along a boundary of each of the lenses, the reflective pattern exposes an aperture portion of the base layer facing each of the lenses, a ratio of an area of the aperture portion of the each of the lenses to an area of the base layer facing the corresponding one of the lenses is in a range of about 30% to about 70%.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention.

DETAILED DESCRIPTION OF THE EMBODIMENTS

Reference will now be made in detail to embodiments which are illustrated in the accompanying drawings. Wherever possible, similar reference numbers will be used to refer to the same or similar parts.

Figure 5:
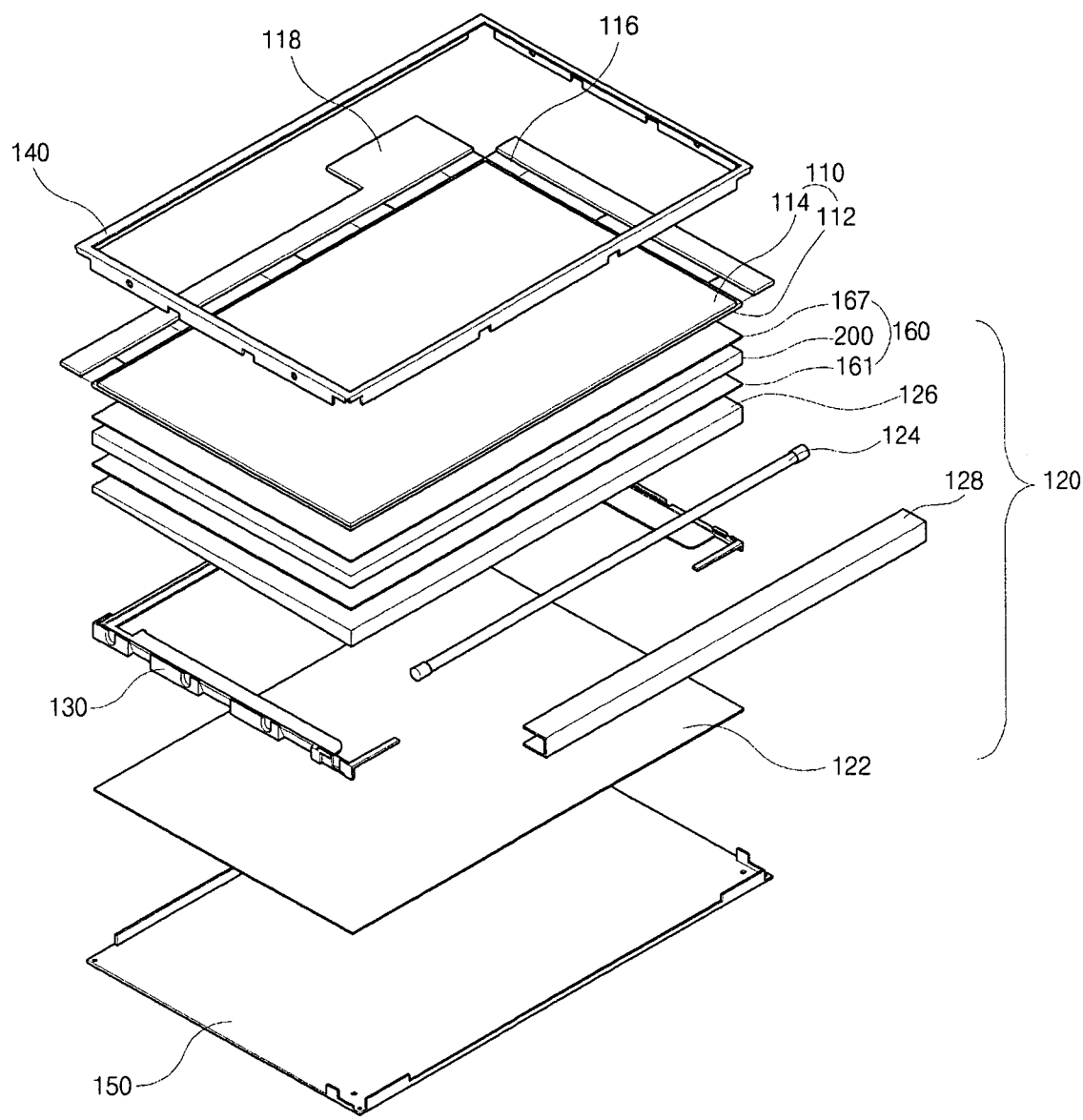
FIG. 5 is an exemplary exploded perspective view of a liquid crystal display device according to an embodiment of the invention.

FIG. 5 is an exemplary exploded perspective view of a liquid crystal display device according to an embodiment of the invention. Referring to FIG. 5, a liquid crystal display (LCD) device includes a liquid crystal panel 110 that display images, a backlight unit 120, a top frame 140, a main frame 130 and a bottom frame 150. The backlight unit 120 is disposed under the liquid crystal panel 110. The backlight unit 120 includes a lamp 124, a lamp guide 128, a reflective plate 122, a light guide plate 126 and a plurality of optical sheets 160.

The lamp guide 128 supporting the lamp 124 has an open portion facing the light guide plate 126 and surrounds and protects the lamp 124 and reflects light toward the light guide plate 126. The light guide plate 126 provides a plane of light to the liquid crystal panel 110 by total reflection of light from the lamp 124. In addition, the light guide plate 126 may include a predetermined pattern to improve uniformity of the plane of light.

The reflective plate 122 is disposed under the light guide plate 126 to reflect light from a rear surface of the light guide plate 126. The reflective plate 122 may have a white color or a silver color.

The lamp 124 is disposed along at least one side of the main frame 130. The lamp 124 may include, for example, a cold cathode fluorescent lamp (CCFL) or an external electrode fluorescent lamp (EEFL).

The plurality of optical sheets 160 disposed over the light guide plate 126 includes a diffusing sheet 161, a collimating sheet 200 and a protecting sheet 167. The diffusing sheet 161 that faces the light guide plate 126 may include a base film and acrylic resin layers on opposite surfaces of the base film. The base film may include polyethylene terephthalate (PET) and the acrylic resin layer may include a diffusing means such as a bead. The diffusing sheet 161 disperses the light from the light guide plate 126 and transmits the light to the collimating sheet 200 by adjusting the direction of light. The collimating sheet 200 on the diffusing sheet 161 collimates the light diffused by the diffusing sheet 161 toward the liquid crystal panel 110. Thus, the light passing through the collimating sheet 200 is emitted along a front direction perpendicular to the liquid crystal panel 110. The protecting sheet 167 protects the collimating layer 200.

The light from the lamp 124 reflected by the lamp guide 128 enters the light guide plate 126 and is refracted toward the plurality of optical sheets 160 in the light guide plate 126. The light from the light guide plate 126 is enhanced in uniformity by the plurality of optical sheets 160 and is supplied to the liquid crystal panel 110. The liquid crystal panel 110 displays images using the light from the plurality of optical sheets 160.

The liquid crystal panel 110 and the backlight unit 120 are attached to each other by the top, main and bottom frames 140, 130 and 150. The top frame 140 covers front boundary portions of the liquid crystal panel 110. The liquid crystal panel 110 and the backlight unit 120 are disposed over the bottom frame 150 having a rectangular plate shape such that edge portions thereof are bent upwardly. The main frame 130 having a rectangular band shape surrounds side portions of the liquid crystal panel 110 and the backlight unit 120. The main frame 130 combined with the top and bottom frames 140 and 150 surrounds the liquid crystal panel 110 and the backlight unit 120 to constitute the LCD device.

Referring back to FIG. 5, the liquid crystal panel 110 includes first and second substrates 112 and 114 facing and spaced apart from each other and a liquid crystal layer (not shown) between the first and second substrates 112 and 114. The first substrate 112 may be referred to as a lower substrate or an array substrate, and the second substrate 114 may be referred to as an upper substrate or a color filter substrate. Although not shown in FIG. 5, a gate line, a data line, a thin film transistor (TFT) including a gate electrode, a semiconductor layer, a source electrode and a drain electrode, and a pixel electrode are formed on an inner surface of the first substrate 112. The gate line crosses the data line to define a pixel region, and the TFT is electrically connected to the gate line and the data line. The pixel electrode is connected to the drain electrode of the TFT.

In addition, a black matrix, a color filter layer and a common electrode are formed on an inner surface of the second substrate 114. The black matrix covers the gate line, the data line and the TFT. The color filter layer includes red, green and blue color filters each corresponding to the pixel region. The common electrode is formed on the color filter layer. Further, an alignment layer determining an initial alignment direction is formed between the liquid crystal layer and each of the first and second substrates 112 and 114, and a seal pattern is formed at a boundary portion between the first and second substrates 112 and 114 to prevent leakage of the liquid crystal layer. Moreover, a polarizing plate is formed on an outer surface of at least of the first and second substrates 112 and 114.

A printed circuit board (PCB) for driving the liquid crystal panel 110 is connected to at least one side of the liquid crystal panel 110 through a connection means such as a flexible printed circuit (FPC). The PCB may be bent to be disposed between the liquid crystal panel 110 and the main frame 130 or between the liquid crystal panel 110 and the bottom frame 150 when the liquid crystal panel 110 is coupled with the top, main and bottom frames 140, 130 and 150.

Figure 1:
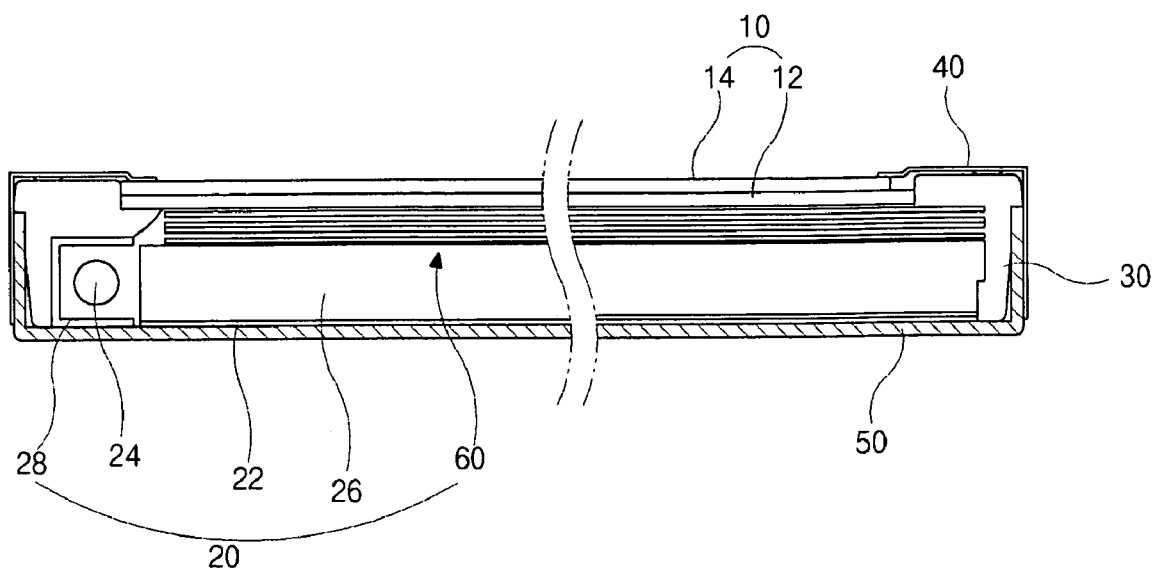
FIG. 1 is a cross-sectional view of a liquid crystal display device including a side light type backlight unit according to the related art.

In an embodiment of the invention, the backlight unit 120 of the LCD device with a single collimating sheet 200 provides an improved collimating efficiency and an improved brightness by reducing light loss caused by a side lobe compared to the related art backlight unit 20 (shown in FIG. 1).

Figure 4:
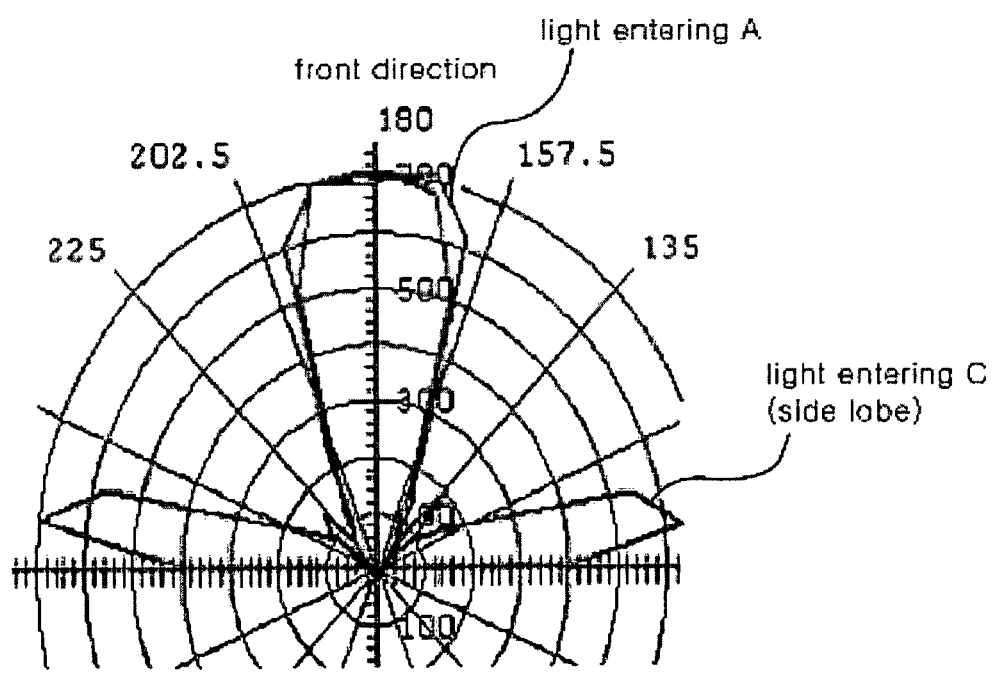
FIG. 4 is a graphical simulation of luminance of light passing through a prism sheet of a backlight unit of a liquid crystal display device according to the related art.
Figure 6:
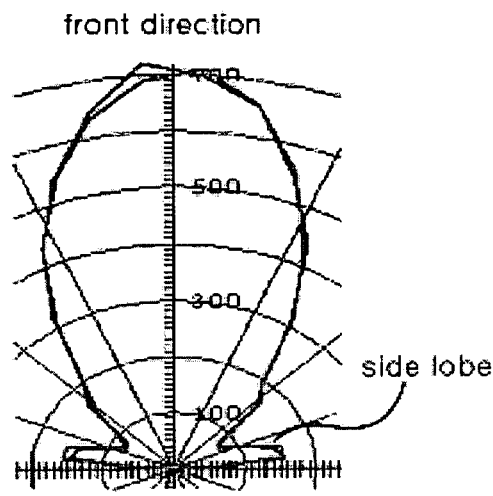
FIG. 6 is a graphical simulation graph of the luminance of light passing through a collimating sheet of a backlight unit of a liquid crystal display device according to an embodiment of the invention.

FIG. 6 is a graphical simulation graph of the luminance of light passing through a collimating sheet of a backlight unit of a liquid crystal display device according to an embodiment of the invention. Referring to FIG. 6, the luminance of light passing through the collimating sheet 200 (shown in FIG. 5) is shown with respect to an azimuthal angle. The azimuthal angle may be defined as an angle with respect to a normal line, i.e., a front direction of the liquid crystal panel 110 perpendicular to the first and second substrates 112 and 114. The azimuthal angle may correspond to the viewing angle. Most of the azimuthal angles of the light emitted from the collimating sheet 200 are distributed within a range of about 0° to about 30° in the front direction, while the light corresponding to a side lobe is reduced. The brightness and the viewing angle property of the collimating sheet 200 are improved as compared with the prism sheet 63 (of FIG. 4). As a result, the light efficiency of the backlight unit 120 (of FIG. 5) including the collimating sheet 200 is improved compared with the related art backlight unit 20.

Figure 7A:
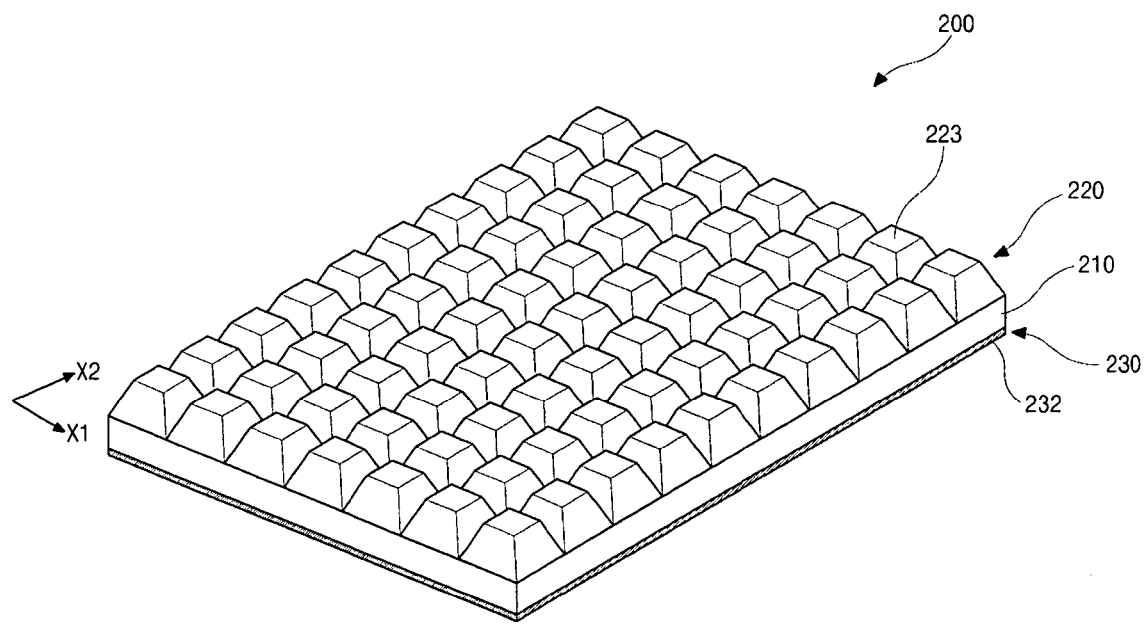
FIGS. 7A and 7B are perspective views of front and rear surfaces, respectively, of an exemplary collimating sheet of a backlight unit for a liquid crystal display device according to an embodiment of the invention.
Figure 7B:
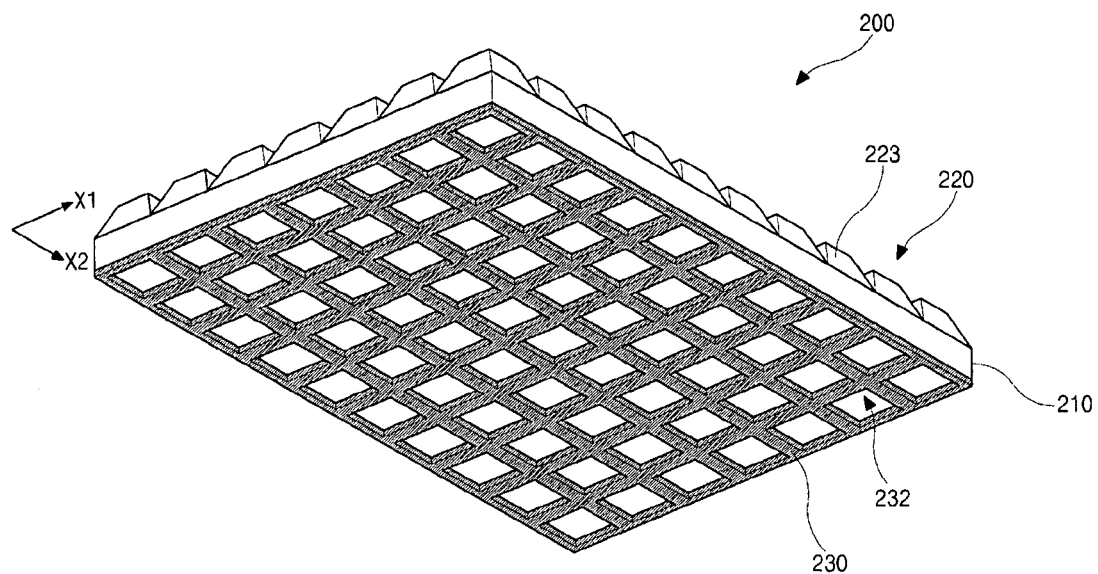

FIGS. 7A and 7B are perspective views of front and rear surfaces, respectively, of an exemplary collimating sheet of a backlight unit for a liquid crystal display device according to an embodiment of the invention. Referring to FIG. 7A, a collimating sheet 200 includes a base layer 210, a collimating layer 220 and a reflective pattern 230. The collimating layer 220 is formed on the front surface of the base layer 210 and collimates light toward the liquid crystal panel 110 (shown in FIG. 5). The reflective pattern 230 recycles light coming from the rear surface of the collimating sheet 200 by reflecting the light toward the front surface of the collimating sheet 200 to reduce the loss of light.

The base layer 210 may include one of polymethylmethacrylate (PMMA) and polyethylene terephthalate (PET) that is a thermoplastic resin. The collimating layer 220 may include one of a transparent acrylic resin and a photosensitive material such as photoresist. The reflective pattern 230 may include, for example, one of silver (Ag), aluminum (Al), silicon oxide ($SiO_2$), titanium oxide ($TiO_2$) and magnesium oxide (MgO).

The collimating layer 220 may include a plurality of lenses 223 each having a truncated pyramidal shape protruding from the base layer 210. The lenses 223 form a pattern on the base layer 223. The rear surface of the truncated pyramid may be a polygon having 3, 4, or more sides. In an exemplary embodiment as shown in FIG. 7A, one or more of the lenses 223 has the shape of a truncated square pyramid protruding from the base layer 210. In an embodiment, the lenses 223 may be symmetrically disposed along first and second perpendicular directions X1 and X2 on the surface of the base layer 210.

Each truncated square pyramidal lens 223 has slanted side surfaces facing the first and second directions X1 and X2 (shown in FIG. 7A). For example, the slanted side surfaces of the lens 223 are inclined toward the front surface of the base layer 210. Thus, the collimating sheet 200 collimates the light from the diffusing sheet 161 (of FIG. 5) toward the liquid crystal panel 110 (shown in FIG. 5) along the first and second directions X1 and X2. Thus, the brightness of the liquid crystal panel 110 is improved.

Moreover, adjacent lenses contact each other without a gap to minimize loss of light. For example, each lens 223 may have a bottom surface of a square shape and the square shapes of two adjacent lenses may have a side in common. Moreover, since the light is collimated along the first and second directions X1 and X2, the brightness inversion angle increases and the viewing angle is substantially improved.

Figure 2:
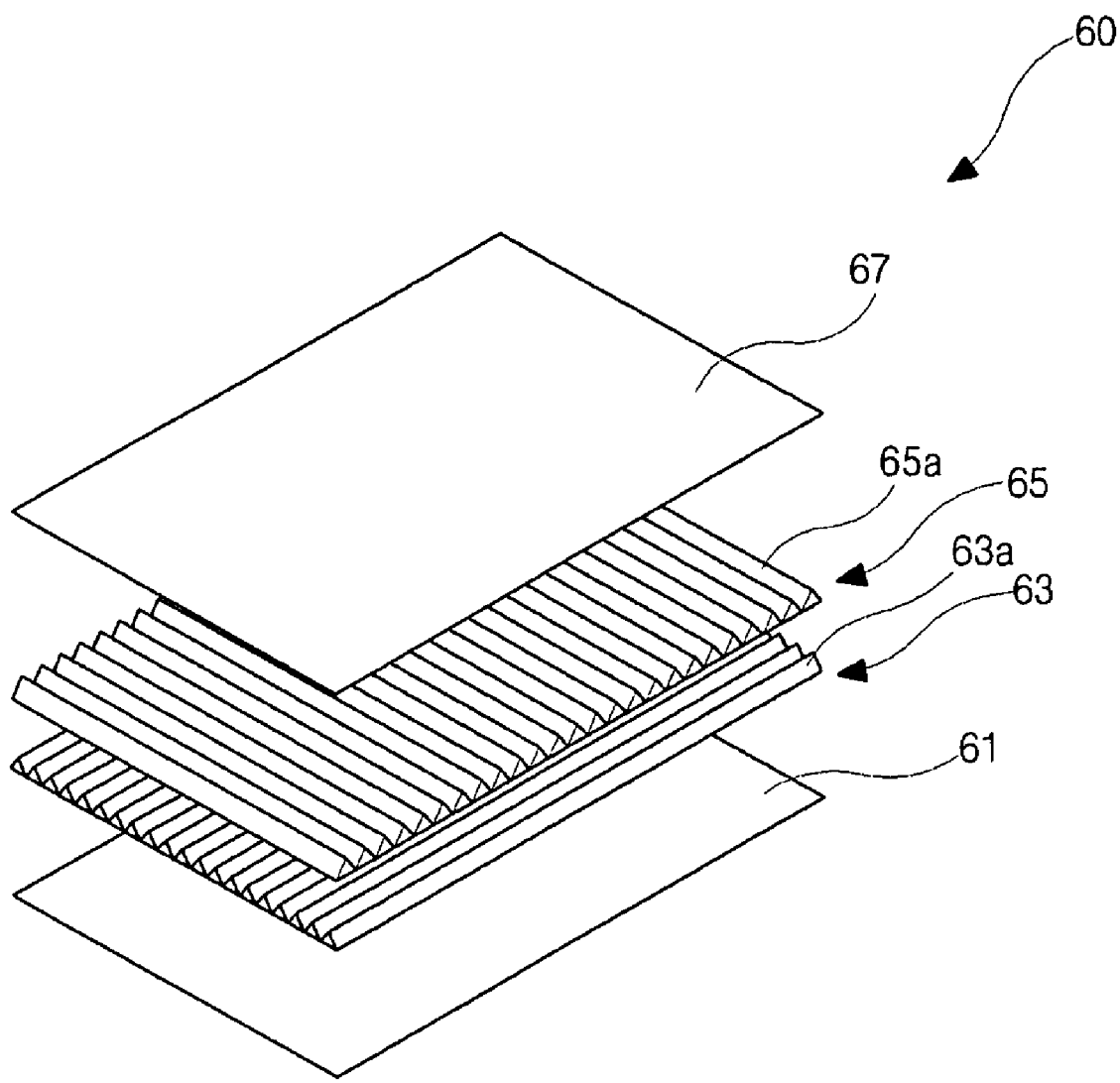
FIG. 2 is a perspective view of a plurality of optical sheets of a backlight unit for a liquid crystal display device according to the related art.
Figure 3:
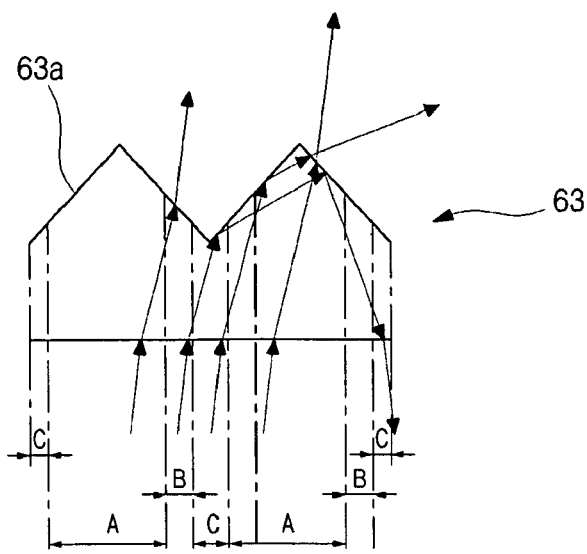
FIG. 3 is a cross-sectional view of a prism sheet of a backlight unit for a liquid crystal display device according to the related art.

In an embodiment of the invention, the light efficiency of the collimating sheet 200 is improved compared with the prism sheet 63 (shown FIG. 2). Using the single collimating sheet 200 in the backlight unit 120 (of FIG. 5) reduces process time and production cost and improves process efficiency.

Referring to FIG. 7B, the reflective pattern 230 is formed on a rear surface of the base layer 210 of the collimating sheet 200. The reflective pattern 230 may have a matrix shape having a plurality of apertures 232 each corresponding to a central portion of each lens 223. Accordingly, the reflective pattern 230 may correspond to a boundary portion of each lens 223. The reflective pattern 230 may have a white color or a silver color.

The shape of each aperture 232 corresponds to the shape of the rear surface of each lens 223, and a center of each aperture 232 coincides with a center of the rear surface of each lens 223. For example, each aperture 232 may have a square shape corresponding to a shape of the bottom surface of each lens 223.

When light from the diffusing sheet 161 (shown in FIG. 5) is incident on the rear surface of the reflective pattern 230, the reflective pattern 230 recycles the incident light by reflecting it back toward the reflective plate 122 (shown in FIG. 5). Then, the reflective plate 122 reflects the recycled light toward the collimating sheet 200. Thus, a loss of light through a side lobe is prevented because the light is recycled by successive reflections on the reflective pattern 230 and the reflective plate 122.

Figure 8:
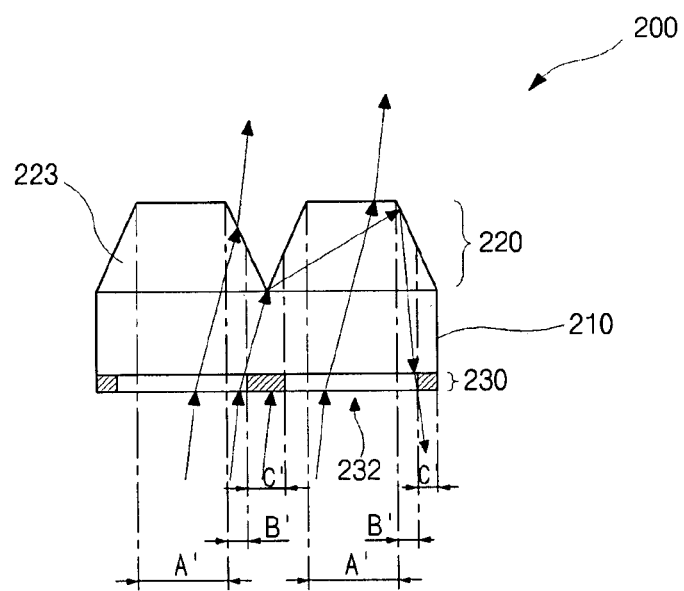
FIG. 8 is a cross-sectional view of an exemplary collimating sheet of a backlight unit for a liquid crystal display device according to an embodiment of the invention.

FIG. 8 is a cross-sectional view of an exemplary collimating sheet of a backlight unit for a liquid crystal display device according to an embodiment of the invention. Referring to FIG. 8, the collimating sheet 200 includes a base layer 210, a collimating layer 220 having a plurality of lenses 223 on a front surface of the base layer 210 and a reflective pattern 230 on a rear surface of the base layer 210. The reflective pattern 230 corresponds to a boundary portion of each lens 223 and includes a plurality of apertures 232 each corresponding to a central portion of each lens 223.

When light is incident on the rear surface of the base layer 210 with an incident angle of about 5°, the rear surface of the base layer 210 may include first, second and third regions A', B' and C'. The incident light is refracted at the rear surface of the base layer 210 due to refractive index difference while passing through the rear surface of the base layer 210. The light entering the first region A' is refracted at a front surface of the collimating layer 220 and is emitted toward the liquid crystal panel 110 (shown in FIG. 5) to increase its brightness. Accordingly, the light entering the first region A' is collimated toward the liquid crystal panel 110 to have an azimuthal angle within a range of about 0° to about 30° in a front direction.

The light entering the second region B' at the rear surface of the base layer 210 is totally reflected at the front surface of the collimating layer 220 and toward the rear surface of the base layer 210. The totally reflected light is emitted from the rear surface of the base layer 210 and may be reflected by the reflective plate 122 (shown in FIG. 5). The reflected light from the reflective plate 122 is re-supplied to the collimating sheet 200. Thus, the loss of light is minimized because the totally reflected light originating from the second region B' may be recycled by the reflection on the reflective plate 122.

The light incident on the third region C' is first reflected at the reflective pattern 230 and is emitted toward the diffusing sheet 161 (shown in FIG. 5). The light first reflected by the reflective pattern 230 may be reflected a second time at the reflective plate 122 and re-supplied to the collimating sheet 200. Accordingly, a loss of light through a side lobe is prevented because the light incident on the third region C' is recycled by the successive reflections on the reflective pattern 230 and the reflective plate 122.

Moreover, the light incident on each of the second and third regions B' and C' may be repeatedly recycled until the recycled light enters the first region A'. As a result, light efficiency and viewing angle are improved.

Figure 9:
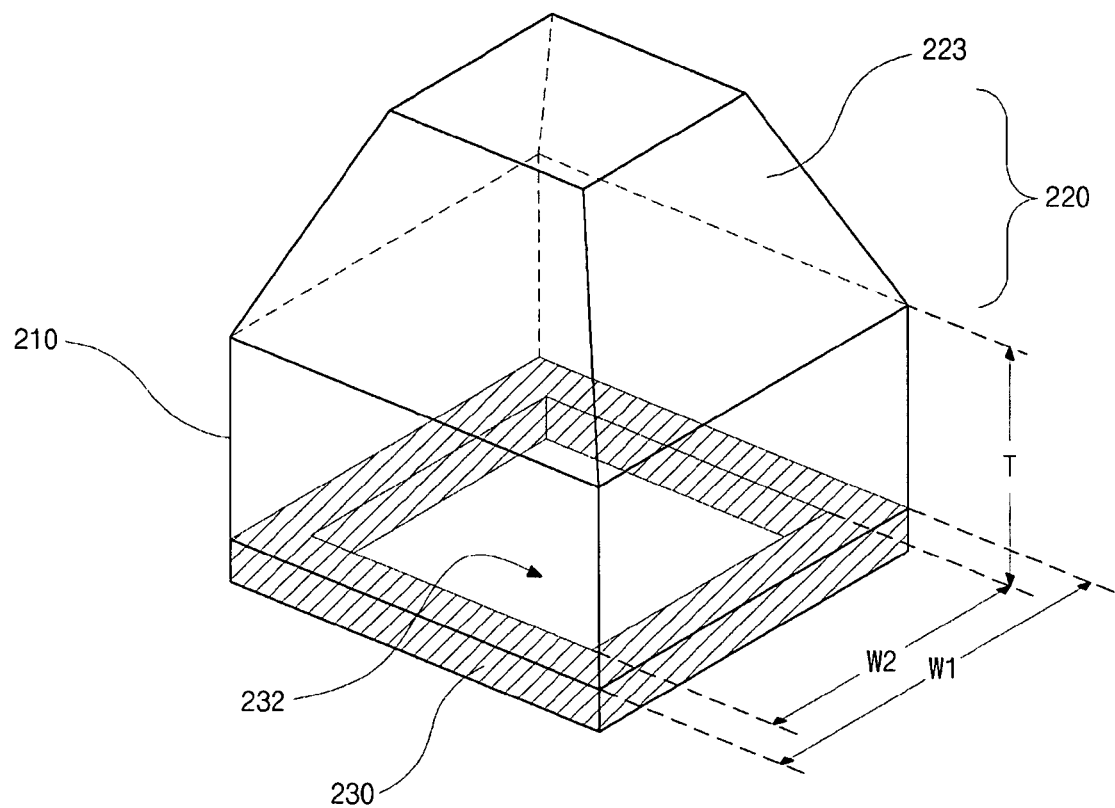
FIG. 9 is a perspective view of a portion of a collimating sheet for a backlight unit corresponding to an exemplary lens of the collimating sheet according to an embodiment of the invention.

FIG. 9 is a perspective view of a portion of a collimating sheet for a backlight unit corresponding to an exemplary lens of the collimating sheet according to an embodiment of the invention. Referring to FIG. 9, the lens 223 of the collimating layer 220 protrudes from a front surface of the base layer 210. The reflective pattern 230 having an aperture 232 is formed on a rear surface of the base layer 210. The lens 223 has a truncated square pyramid shape, and the base layer 210 corresponding to the lens 223 has a thickness T. The rear surface of the portion of the base layer 210 corresponding to the lens 223, i.e., the bottom surface of each lens 223 has a square shape having a first side W1. The aperture 232 corresponds to a central portion of the lens 223 and has a square shape having a second side W2. An area ratio ($W2^2/W1^2$) of an area of the aperture 232 (aperture area) to an area of the rear surface of the base layer 210 corresponding to the lens 223 may be determined by a normal luminance of the collimating sheet 200 based on a refractive index of the base layer 210 and the collimating layer 220 and an azimuthal angle distribution of emitted light. For example, the area ratio ($W2^2/W1^2$) of the area of the aperture 232 to the unit area of the rear surface of the base layer 210 corresponding to the lens 223 may be within a range of about 30% to about 70%. TABLE 1 shows a ratio (relative normal luminance) of a luminance of light normally emitted from the collimating sheet 200 (of FIG. 5) to a luminance of incident light according to the first side W1, the second side W2, the thickness T and the area ratio.

TABLE 1

| | sample 1 | sample 2 | sample 3 |
|---|---|---|---|
| first side (W1) | 0.1 mm | 0.1 mm | 0.1 mm |
| second side (W2) | 0.05 mm | 0.07 mm | 0.07 mm |
| area ratio of aperture area to unit cell area ($W2^2/W1^2$) | 25% | 49% | 49% |
| thickness of base layer (T) | 0.05 mm | 0.05 mm | 0.075 mm |
| relative normal luminance | 95.7% | 97.1% | 102.9% |

As shown in samples 1 and 2 of TABLE 1, when the base layers of the collimating sheets have substantially the same thickness, the relative normal luminance increases with the area ratio. Further, as shown in samples 2 and 3 of TABLE 2, when the collimating sheets have has collimating sheet having an equal area ratio, as the thickness of the base layer increases, the relative normal luminance increases. Accordingly, the area ratio may be determined to be within a range of about 30% to about 70% or within a range of about 40% to about 60% for higher relative normal luminance.

Figure 10:
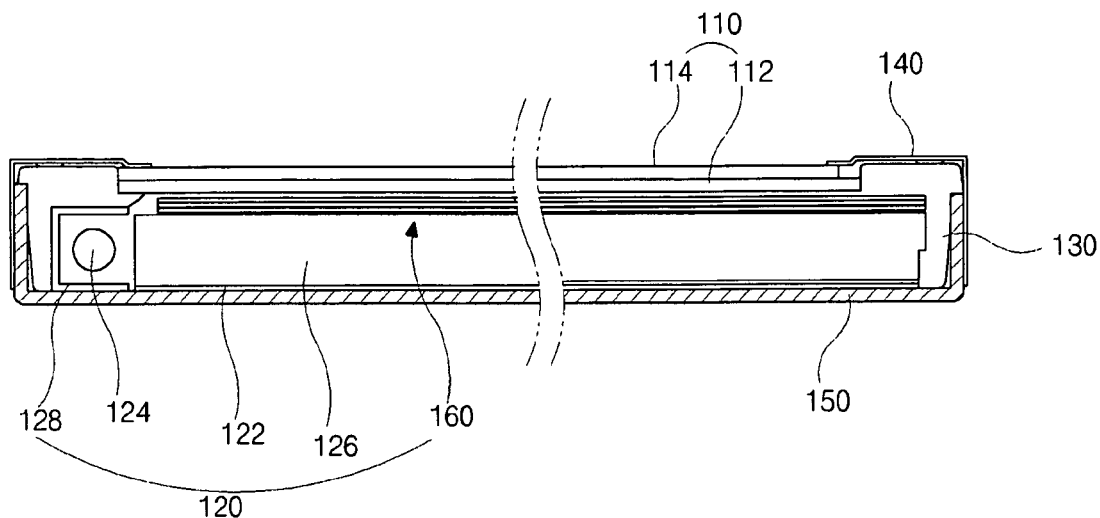
FIG. 10 is a cross-sectional view of the exemplary liquid crystal display device shown in FIG. 5.

FIG. 10 is a cross-sectional view of the exemplary liquid crystal display device shown in FIG. 5. Referring to FIG. 10, the reflective plate 122, the light guide plate 126 and the plurality of optical sheets 160 are sequentially disposed over the bottom frame 150. Since the plurality of optical sheets 160 includes a collimating sheet 200 (shown FIG. 5) rather than the two prism sheets as in the related art, a overall thickness of the optical sheets 160 is reduced while the collimating efficiency is improved. In an embodiment, a thickness of the plurality of optical sheets 160 may be reduced by about 23% compared with a plurality of optical sheets 60 (of FIG. 2). As a result, a total thickness of the LCD device is also reduced. In addition, production cost and process time for the backlight unit 120 are reduced, thereby process efficiency for the LCD device is improved.

Figure 11A:
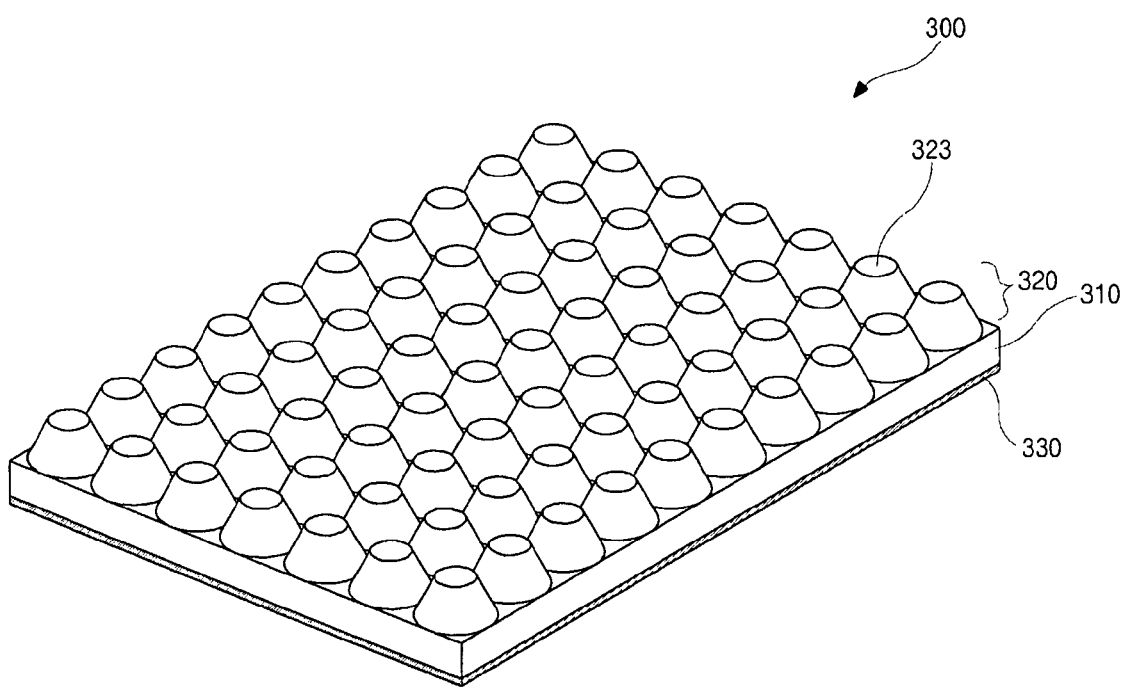
FIG. 11A is perspective view of a second exemplary collimating sheet of a backlight unit for a liquid crystal display device according to another embodiment of the invention.

FIG. 11A is perspective view of a second exemplary collimating sheet of a backlight unit for a liquid crystal display device according to another embodiment of the invention. Referring to FIG. 11A, a collimating sheet 300 includes a base layer 310, a collimating layer 320 on an front surface of the base layer 310 and a reflective pattern 330 on a rear surface of the base layer 310. The collimating layer 320 includes a plurality of lenses 323 each having a truncated cone shape protruding from the base layer 310, and the plurality of lenses 323 are symmetrically disposed along first and second directions perpendicular to each other. For example, the conical surface of each lens is inclined toward the front surface of the base layer. Although not shown in FIG. 11A, the reflective pattern 330 includes a plurality of apertures each having a shape corresponding to a shape of the bottom surface of each lens 323. For example, each aperture and the bottom surface of each lens 323 may have a circular shape.

Figure 11B:
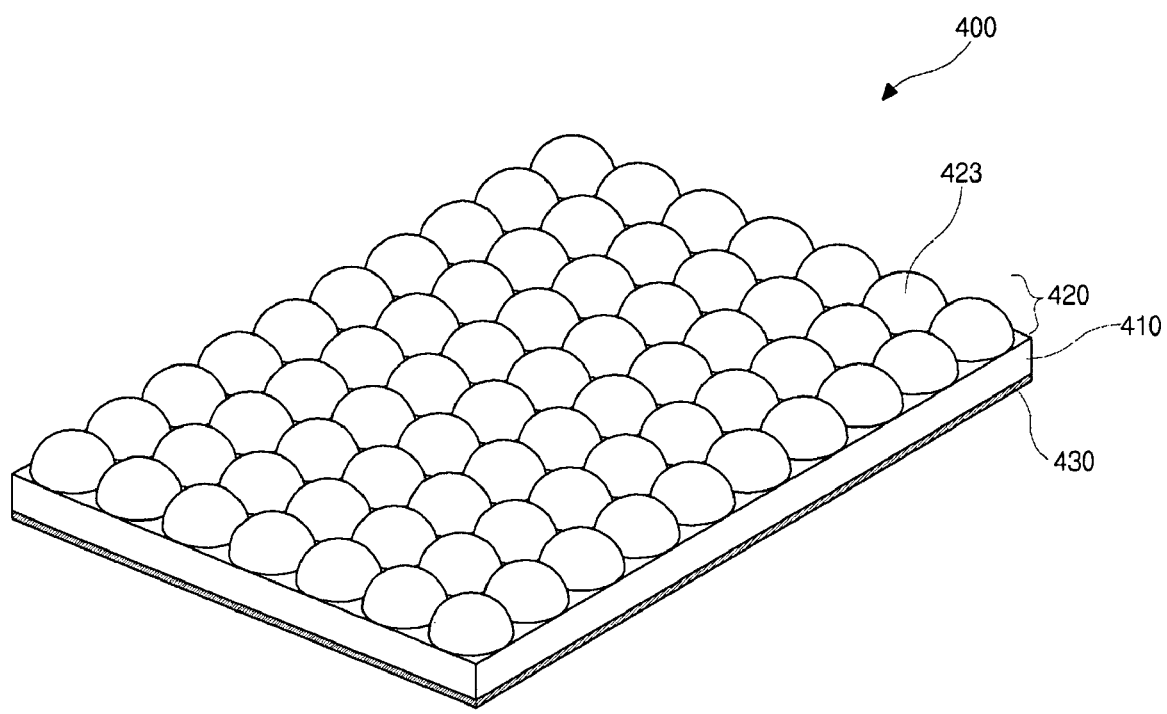
FIG. 11B is perspective view of a third exemplary collimating sheet of a backlight unit for a liquid crystal display device according to another embodiment of the invention.

FIG. 11B is perspective view of a third exemplary collimating sheet of a backlight unit for a liquid crystal display device according to another embodiment of the invention. Referring to FIG. 11B, a collimating sheet 400 includes a base layer 410, a collimating layer 420 on an front surface of the base layer 410 and a reflective pattern 430 on a rear surface of the base layer 410. The collimating layer 420 includes a plurality of lenses 423 each having a hemispheric shape protruding from the base layer 410, and the plurality of lenses 423 are symmetrically disposed along first and second directions perpendicular to each other. Although not shown in FIG. 11B, the reflective pattern 430 includes a plurality of apertures having a shape corresponding to a shape of a bottom surface of each lens 423. For example, each aperture and the bottom surface of each lens 423 may have a circular shape.

Although not shown, each lens may have a truncated polygonal pyramid shape such as a truncated triangular pyramid shape, a truncated pentagonal pyramid shape and a truncated hexagonal pyramid shape in another embodiment.

In embodiments, rather than using a side light type backlight unit, a direct light type backlight unit may be used to project light on the plurality of optical sheets including the single collimating unit. For example, a plurality of lamps may be disposed over a reflective plate and a plurality of optical sheets including a collimating sheet may be disposed over the plurality of lamps. A light guide plate is not required in the direct light type backlight unit.

Consequently, since a single collimating sheet including a reflective pattern is used for a backlight unit, a total thickness of an LCD device is reduced. In addition, production cost for an LCD device is reduced. Further, process time for an LCD device is reduced and process efficiency for an LCD device is improved. Moreover, since light loss such as a side lobe is reduced, collimating efficiency and relative normal brightness of a backlight unit including a single collimating sheet are improved. Finally, since light is collimated along two perpendicular directions by a single collimating sheet, brightness inversion angle increases, thereby viewing angle of an LCD device substantially improved.

It will be apparent to those skilled in the art that various modifications and variations can be made in embodiments of the backlight unit and the liquid crystal display device including the backlight unit of the invention without departing from the spirit or scope of the invention. Thus, it is intended that the invention cover the modifications and variations of embodiments of this invention provided they come within the scope of the appended claims and their equivalents.

What is claimed is:

1. A backlight unit for a liquid crystal display panel, comprising:
  a diffusor that diffuses light emitted from a front surface thereof;
  a reflective plate that reflects light toward a rear surface of the diffusor; and
  a collimator that collimates the light emitted from the front surface of the diffusor toward the liquid crystal display panel, the collimator including:
    a base layer that refracts the diffused light from the diffusor toward the liquid crystal panel, the base layer has a single flat rear surface such that a rear of the entire base layer is evenly formed,
    a collimating layer of lenses disposed along two perpendicular directions on a front surface of the base layer, and
    a reflective pattern contacting and directly on the single flat rear surface of the base layer along a boundary of each of the lenses, the reflective pattern in a matrix shape having a plurality of apertures each facing each of the lenses, wherein the single flat rear surface of the base layer includes first, second and third regions, and
  wherein when the diffused light is incident on the single flat rear surface of the base layer with an incident angle of about 5°, the light entering the first region is collimated toward the liquid crystal panel to have an azimuthal angle within a range of about 0° to about 30° in a front direction, the light entering the second region is totally reflected at a front surface of the collimating layer and toward the single flat rear surface of the base layer and is recycled by reflection on the reflective plate, and the light entering the third region is reflected at the reflective pattern and toward the diffuser and is recycled by reflection on the reflective plate.

2. The backlight unit of claim 1, wherein each of the lenses has a truncated pyramidal shape.

3. The backlight unit of claim 2, wherein each of the lenses is shaped as truncated square pyramid.

4. The backlight unit of claim 1, wherein each of the lenses having a first surface that refracts the light refracted by the base layer toward the liquid crystal panel and a second surface that reflects the light refracted by the base layer to the single flat rear surface of the base layer.

5. The backlight unit of claim 4, wherein the first surface of each of the lenses is substantially parallel to the single flat rear surface of the base layer.

6. The backlight unit of claim 4, wherein the second surface of each of the lenses is inclined toward the front surface of the base layer.

7. The backlight unit of claim 1, wherein each of the lenses has a truncated cone shape.

8. The backlight unit of claim 1, wherein each of the lenses has an hemispherical shape.

9. The backlight unit of claim 1, wherein a ratio of an area of the aperture portion of each of the lenses to an area of the base layer facing the corresponding one of the lenses is in a range of about 30% to about 70%.

10. The backlight unit of claim 1, wherein a ratio of an area of the aperture portion of each of the lenses to an area of the base layer facing the corresponding one of the lenses is in a range of about 40% to about 60%.

11. The backlight unit of claim 1, further comprising a protecting sheet over the collimating sheet.

12. The backlight unit of claim 1, including:
a lamp;
a light guide that projects light from the lamp toward a rear surface of the diffusor; and
a lamp guide that supports the lamp at a side of the light guide and reflects light from the lamp toward the light guide.

13. The backlight unit of claim 1, including one or more lamp disposed over the reflective plate to project light toward the rear surface of the diffusor.

14. The backlight unit of claim 1, wherein the base layer includes one of polymethylmethacrylate (PMMA) and polyethylene terephthalate (PET).

15. The backlight unit of claim 1, wherein the collimating layer includes one of a transparent acrylic resin and a photosensitive material such as photoresist.

16. The backlight unit of claim 1, wherein the reflective pattern includes one of silver (Ag), aluminum (Al), silicon oxide ($SiO_2$), titanium oxide ($TiO_2$) and magnesium oxide (MgO).

17. A liquid crystal display device, including the backlight unit of claim 1, including:
a light guide that projects light toward the rear surface of the diffusor; and
a liquid crystal display panel that displays images with the light from the diffusor.

18. A backlight unit for a liquid crystal display panel, comprising:
a diffusor that diffuses light emitted from a front surface thereof; and
a collimator that collimates the light emitted from the front surface of the diffusor toward the liquid crystal display panel, the collimator including:
a base layer that refracts the diffused light from the diffusor toward the liquid crystal panel, the base layer has a single flat rear surface such that a rear of the entire base layer is evenly formed,
a collimating layer of lenses on a front surface of the base layer, each of the lenses refracts the light refracted from a first region of the base layer toward the liquid crystal panel and reflects the light refracted from a second region of the base layer to the single flat rear surface of the base layer, and
a reflective pattern contacting and directly on the single flat rear surface of the base layer along a boundary of each of the lenses, the reflective pattern in a matrix shape having a plurality of apertures each facing each of the lenses, a ratio of an area of the aperture portion of the each of the lenses to an area of the base layer facing the corresponding one of the lenses is in a range of about 30% to about 70%, wherein the single flat rear surface of the base layer includes first, second and third regions, and
wherein when the diffused light is incident on the single flat rear surface of the base layer with an incident angle of about 5°, the light entering the first region is collimated toward the liquid crystal panel to have an azimuthal angle within a range of about 0° to about 30° in a front direction, the light entering the second region is totally reflected at a front surface of the collimating layer and toward the single flat rear surface of the base layer and is recycled, and the light entering the third region is reflected at the reflective pattern and toward the diffuser and is recycled.

19. The backlight unit of claim 18, wherein each of the lenses has a truncated pyramidal shape.

20. The backlight unit of claim 18, including:
a light guide that projects light incident on a side thereof toward a rear surface of the diffusor; and
a reflective plate that reflects light toward a rear surface of the diffusor.

* * * * *